(12) United States Patent
Sugiura et al.

(10) Patent No.: US 7,502,201 B2
(45) Date of Patent: Mar. 10, 2009

(54) MAGNETIC HEAD SLIDER MATERIAL, MAGNETIC HEAD SLIDER, AND METHOD OF MANUFACTURING MAGNETIC HEAD SLIDER MATERIAL

(75) Inventors: Kei Sugiura, Tokyo (JP); Yukio Kawaguchi, Tokyo (JP); Atsushi Hitomi, Tokyo (JP)

(73) Assignee: TDK Corporation, Tokyo (JP)

( * ) Notice: Subject to any disclaimer, the term of this patent is extended or adjusted under 35 U.S.C. 154(b) by 392 days.

(21) Appl. No.: 11/311,298

(22) Filed: Dec. 20, 2005

(65) Prior Publication Data
US 2007/0153421 A1 Jul. 5, 2007

(30) Foreign Application Priority Data
Jan. 6, 2005 (JP) ............................. P2005-001760

(51) Int. Cl.
G11B 5/127 (2006.01)
(52) U.S. Cl. .................................. 360/235.1
(58) Field of Classification Search ........................ None
See application file for complete search history.

(56) References Cited

U.S. PATENT DOCUMENTS

| 5,520,716 | A | 5/1996 | Takagi et al. | |
|---|---|---|---|---|
| 6,437,943 | B1* | 8/2002 | Yokote et al. | 360/235.3 |
| 2004/0233583 | A1* | 11/2004 | Yanagisawa | 360/294.7 |
| 2005/0094316 | A1* | 5/2005 | Shiramatsu et al. | 360/234.5 |
| 2005/0168873 | A1* | 8/2005 | Kawaguchi et al. | 360/235.1 |
| 2005/0280934 | A1* | 12/2005 | Nakayama | 360/122 |
| 2006/0002027 | A1 | 1/2006 | Kawaguchi et al. | |
| 2006/0023367 | A1* | 2/2006 | Suk | 360/323 |

FOREIGN PATENT DOCUMENTS

| CN | 1724457 A | 1/2006 |
|---|---|---|
| JP | A-57-082172 | 5/1982 |
| JP | B2-3121980 | 1/2001 |

* cited by examiner

*Primary Examiner*—Mark Blouin
(74) *Attorney, Agent, or Firm*—Oliff & Berridge, PLC

(57) ABSTRACT

The magnetic head slider material of the present invention is a magnetic head slider material made of a sintered body containing alumina, titanium carbide, and carbon; wherein a titanium carbide crystal grain has an average crystal grain size greater than that of an alumina crystal grain in the sintered body.

12 Claims, 5 Drawing Sheets

MAGNETIC HEAD SLIDER MATERIAL, MAGNETIC HEAD SLIDER, AND METHOD OF MANUFACTURING MAGNETIC HEAD SLIDER MATERIAL

BACKGROUND OF THE INVETION

1. Field of the Invention

The present invention relates to a magnetic head slider material, a magnetic head slider, and a method of manufacturing a magnetic head slider material.

2. Related Background Art

A magnetic head slider including a thin-film magnetic head came into use in a hard disk drive for the first time in 1979. The magnetic head slider at that time has been referred to as mini slider (100% slider) in general. Thereafter, magnetic head sliders have been reducing their size so as to become the nano slider (50% slider) whose size is about 50% that of the mini slider by way of the micro slider (70% slider) whose size is about 70% that of the mini slider.

In general, the magnetic head slider comprises a laminate, disposed on a substrate, including a thin-film magnetic head. Such a magnetic head slider is obtained by the steps of stacking a laminate including a thin-film magnetic head on a substrate so as to yield a laminate structure; then cutting the laminate structure in parallel with the laminating direction, so as to form an exposed surface of the thin-film magnetic head; and lapping (grinding) the exposed surface, so as to yield an air bearing surface.

When manufacturing a conventional magnetic head slider, a sintered body having a high strength mainly composed of alumina and titanium carbide, i.e., so-called AlTiC sintered body, has been employed as a substrate of the magnetic head slider as disclosed in Japanese Patent Application Laid-Open No. SHO 57-82172, for example. Recently, on the other hand, materials aimed at improving the workability have vigorously been developed. For example, a magnetic head substrate in which the average crystal grain size of alumina crystal grains is greater than the average crystal grain size of titanium carbide crystal grains by 5 to 50% in its sintered body has been proposed (see Japanese Patent Publication No. 3121980, for example). This magnetic head substrate is aimed at improving the processing speed in the processing with ion irradiation and the surface quality after the processing.

SUMMARY OF THE INVENTION

Currently, a magnetic head slider referred to as pico slider (30% slider) whose size is about 30% that of the mini slider has become mainstream. As hard disk drives cut down their size and cost, magnetic head sliders are expected to become smaller from now on, so as to shift to the femto slider (20% slider), whose size is about 20% that of the mini slider, in future.

As the magnetic head sliders become smaller, differences in level in the air bearing surface which are caused by the difference in the amount of grinding between the substrate and the laminate stacked on the substrate are required to be reduced in the lapping step at the time of forming the air bearing surface.

However, the grinding speed of the AlTiC sintered body employed as the substrate in conventional magnetic head sliders such as the one disclosed in the above-mentioned Japanese Patent Application Laid-Open No. SHO 57-82172 is much lower than that of the laminate including the thin-film magnetic head, which makes the amount of grinding of the laminate much greater than the amount of grinding of the substrate at the time of lapping, thereby yielding a large difference in level.

On the other hand, studies conducted by the inventors have revealed that even the magnetic head slider material disclosed in the above-mentioned Japanese Patent Publication No. 3121980 is hard to fully raise the grinding speed while sufficiently keeping the mechanical strength of the substrate in mechanical processing such as lapping.

In view of the circumstances mentioned above, it is an object of the present invention to provide a magnetic head slider material which can reduce differences in level in the air bearing surface while having a sufficient strength, a magnetic head slider using the same, and a method of manufacturing the magnetic head slider material.

The inventors conducted diligent studies in order to overcome the above-mentioned problem and, as a result, have found that a sintered body containing, at least, alumina, titanium carbide, and carbon in which the average crystal grain size of titanium carbide crystal grains and the average crystal grain size of alumina crystal grains in the sintered body satisfy a specific relationship yields a sufficiently high grinding speed while having a sufficient strength, thereby completing the present invention.

Namely, the magnetic head slider material in accordance with the present invention is a magnetic head slider material made of a sintered body containing alumina, titanium carbide, and carbon; wherein a titanium carbide crystal grain has an average crystal grain size greater than that of an alumina crystal grain in the sintered body.

Because of the structure mentioned above, the magnetic head slider material in accordance with the present invention has a sufficient strength and can make the grinding speed faster than that of the AlTiC sintered body used in the conventional magnetic head slider material, whereby the difference between the grinding speed of the substrate using this magnetic head slider material and the grinding speed of the laminate including the thin-film magnetic head can be made sufficiently smaller than that conventionally obtained. This makes it harder for differences in level to occur in an air bearing surface formed by lapping when manufacturing a magnetic head slider, more specifically, when manufacturing a magnetic head slider by forming a laminate structure by stacking a laminate including a thin-film magnetic head onto a substrate made of this magnetic head slider material and then lapping a cross section of the laminate structure parallel to its laminating direction.

Though not completely clear, the inventors assume that the following is a reason why the magnetic head slider material of the present invention can increase the grinding speed while having a sufficient strength. Namely, the inventors infer that, since the sintered body contains alumina, titanium carbide, and carbon while the average crystal grain size of alumina crystal grains is smaller than that of titanium carbide crystal grains, peeling between micro-order crystal grains smoothly proceeds in mechanical processing, while the sintered body keeps a sufficient strength.

Preferably, in the magnetic head slider material of the present invention, the average crystal grain size of the alumina crystal grain is 0.75 µm or less. This can further increase the grinding speed while sufficiently keeping the strength of the magnetic head slider material.

Preferably, the average crystal grain size of the titanium carbide crystal grain is 1 µm or less. When the average crystal grain size exceeds 1 µm, the grinding speed tends to decrease.

Preferably, in the magnetic head slider material of the present invention, the sintered body further contains silicon carbide. When the sintered body contains silicon carbide, the thermal conduction in the sintered body improves, whereby the magnetic head slider material of the present invention can exhibit a sufficient heat dissipation. Consequently, an oxide film (e.g., alumina) forming a base for the thin-film part of the thin-film magnetic head can be made thinner, which is effective in improving the productivity of thin-film magnetic heads, and in facilitating the temperature control of substrate materials in film forming steps in vacuum or under reduced pressure when manufacturing thin-film magnetic heads.

The magnetic head slider in accordance with the present invention comprises a substrate made of a sintered body and a laminate, formed on the sintered body, including a thin-film magnetic head; wherein the sintered body contains alumina, titanium carbide, and carbon, while a titanium carbide crystal grain has an average crystal grain size greater than that of an alumina crystal grain in the sintered body.

Since the magnetic head slider of the present invention includes the substrate made of the sintered body, differences in level are harder to occur in an air bearing surface formed by lapping when manufacturing a magnetic head slider, more specifically, when manufacturing a magnetic head slider by lapping a cross section of the laminate parallel to its laminating direction, whereby the magnetic head slider can easily be made smaller.

Preferably, in the magnetic head slider of the present invention, the average crystal grain size of the alumina crystal grain is 0.75 μm or less. This can further increase the grinding speed while sufficiently keeping the strength of the magnetic head slider material, whereby the magnetic head slider becomes more suitable for reducing its size.

Preferably, the average crystal grain size of the titanium carbide crystal grain is 1 μm or less. When the average crystal grain size exceeds 1 μm, the grinding speed tends to decrease.

Preferably, in the magnetic head slider of the present invention, the sintered body further contains silicon carbide. When the sintered body contains silicon carbide, the thermal conduction in the sintered body improves, whereby the magnetic head slider of the present invention can exhibit a better heat dissipation. This can reduce the influence of heat at the time of energization, whereby the magnetic head slider can be realized with a higher reliability.

The method of manufacturing a magnetic head slider material in accordance with the present invention comprises a step of preparing a molded body containing alumina, titanium carbide, and carbon; and a sintering step of manufacturing a sintered body by sintering the molded body at a predetermined sintering temperature in a nonoxidizing atmosphere so that an average crystal grain size of an alumina crystal grain becomes smaller than that of a titanium carbide crystal grain in the sintered body.

This manufacturing method can yield the above-mentioned magnetic head slider material in accordance with the present invention.

The step of preparing the molded body may yield a mixed powder by mixing a powder containing alumina, a powder containing titanium carbide, and a powder containing carbon, and mold the mixed powder.

The step of preparing the molded body may yield a mixture by mixing a powder containing alumina, a powder containing titanium carbide, and an organic matter; carbonize the organic matter in the mixture by heat treatment in a nonoxidizing atmosphere, so as to obtain a mixed powder; and mold the mixed powder.

The step of preparing the molded body may yield a mixture by mixing a powder containing alumina, a powder containing titanium carbide, and an organic matter; mold the mixture; and heat-treat the molded mixture in a nonoxidizing atmosphere, so as to carbonize the organic matter in the mixture.

From the viewpoint of manufacturing the above-mentioned magnetic head slider material more easily and more reliably, it will be preferred in the method of manufacturing a magnetic head slider material in accordance with the present invention if alumina contained in the molded body has an average particle size of 0.6 μm or less while titanium carbide contained in the molded body has an average particle size of 1 μm or less in the step of preparing the molded body. As a consequence, the average grain size of alumina crystal grains can be made smaller than the average grain size of titanium carbide crystal grains in the sintered body more easily and more reliably. Such effects seem to be obtained because the average particle sizes of alumina and titanium carbide falling within the above-mentioned ranges and the molded body containing carbon can fully restrain alumina from growing its grains in the sintering step even under a condition where only alumina is likely to grow its grains while titanium carbide hardly grows its grains, in particular in the case where the temperature rise rate is low (1 to 5° C./min) when temperature rises from 500° C. to the sintering temperature.

Preferably, the temperature rise rate is at least 5° C./min when temperature rises from 500° C. to the sintering temperature in the sintering step. Heating the molded body containing alumina, titanium carbide, and carbon under such a condition can fully restrain alumina from growing its grains in the sintering step, whereby the average grain size of alumina crystal grains can be made smaller than the average grain size of titanium carbide crystal grains in the sintered body more easily and more reliably.

From the viewpoint of manufacturing the above-mentioned magnetic head slider material more easily and more reliably, it will be preferred in the step of preparing the molded body if alumina contained in the molded body has an average particle size of 0.2 to 0.6 μm, and titanium carbide contained in the molded body has an average particle size of 0.2 to 1 μm.

The molded body containing alumina with the above-mentioned average particle size, titanium carbide with the above-mentioned average particle size, and carbon can more reliably make the average crystal grain size of alumina crystal grains smaller than the average crystal grain size of titanium carbide crystal grains in the sintered body even under a condition where only alumina is likely to grow its grains while titanium carbide hardly grows its grains in the sintering step, in particular in the case where the temperature rise rate is low (1 to 5° C./min) when temperature rises from 500° C. to the sintering temperature.

Preferably, in the method of manufacturing a magnetic head slider material in accordance with the present invention, the molded body further contains silicon carbide. This makes it easier to. yield a magnetic head slider material excellent in heat dissipation.

The present invention can realize a magnetic head slider having reduced differences in level of the air bearing surface while having a sufficient strength. This can manufacture a magnetic head slider having a smaller size, and enables higher density.

DESCRIPTION OF THE PREFERRED EMBODIMENTS

In the following, preferred embodiments of the present invention will be explained in detail with reference to the accompanying drawings. In the explanation of the drawings, constituents identical or equivalent to each other will be referred to with numerals identical to each other without repeating their overlapping descriptions. Proportions of sizes in the drawings do not always match those in practice.

Magnetic Head Slider Material

First, the magnetic head slider material in accordance with an embodiment will be explained. The first magnetic head slider material in accordance with. this embodiment is a sintered body containing alumina ($Al_2O_3$), titanium carbide (TiC), and carbon (C). In the sintered body, alumina and titanium carbide form their respective crystal grains. In the sintered body, carbon is a free component chemically combined to neither alumina nor titanium carbide, and mainly exists in crystal grain boundaries of alumina and titanium carbide.

Here, the average crystal grain size of titanium carbide crystal grains is required to be greater than the average crystal grain size of alumina crystal grains in the sintered body. This enables the magnetic head slider material to have a sufficient strength and raise the grinding speed sufficiently. For the average crystal grain sizes of titanium carbide crystal grains and alumina crystal grains, this specification employs the values determined by the following method.

The average crystal grain sizes of titanium carbide crystal grains and alumina crystal grains are determined in the following manner. First, the sintered body is cut, the resulting cut section is processed into a mirror surface, and then this surface is thermally etched at (the sintering temperature—100)° C. The surface is photographed under a magnification of 30,000× with a scanning electron microscope, and straight lines are radially drawn on this photograph. Specifically, a vertical line, a horizontal line, and two diagonal lines are drawn so as to pass the center of the rectangular photograph of 9 mm (L)×12 mm (W). The sum of the lines is 30 mm. Then, the number of intersections at which the lines cross crystal grain boundaries is counted, and the average crystal grain sizes of crystal grains of titanium carbide and alumina are determined by the calculation of (the total length of lines (mm))/(the total number of intersections×the photographic magnification).

In this embodiment, the average crystal grain size of alumina crystal grains is preferably 0.2 to 0.75 µm, more preferably 0.2 to 0.6 µm, further preferably 0.2 to 0.4 µm. The grinding speed tends to decrease when the average crystal grain size of alumina crystal grains exceeds 0.75 µm, whereas such a sintered body is harder to attain when the average crystal grain size is smaller than 0.2 µm.

The average crystal grain size of titanium carbide crystal grains is preferably 0.2 to 1 µm, more preferably 0.2 to 0.6 µm. The grinding speed tends to decrease when the average crystal grain size of titanium carbide grains exceeds 1 µm, whereas such a sintered body is harder to attain when the average crystal grain size is smaller than 0.2 µm.

The titanium carbide content in the magnetic head slider material of this embodiment is preferably 20 to 120 parts by weight when the weight of alumina is 100 parts by weight. Such a range makes it easier to yield a magnetic head substrate having a sufficient strength, and lowers the electric resistance of the material, whereby an antistatic effect is more likely to be obtained. When the titanium carbide concentration is less than 20 parts by weight, the rigidity tends to decrease, thereby lowering the strength. When the titanium carbide concentration exceeds 120 parts by weight, on the other hand, the sinterability tends to decrease, thereby lowering the strength.

When the weight of alumina is 100 parts by weight, the carbon content in the magnetic head slider material is preferably 0.2 to 9 parts by weight, more preferably 0.3 to 2.0 parts by weight, further preferably 0.5 to 1.5 parts by weight. The carbon content exceeding 9 parts by weight is unfavorable, since the strength of the material tends to become too weak. When the carbon content is lower than 0.2 part by weight, on the other hand, the grinding speed is harder to become sufficiently high.

The second magnetic head slider material in accordance with this embodiment is a sintered body containing alumina ($Al_2O_3$), titanium carbide (TiC), silicon carbide (SiC), and carbon (C). In the sintered body, alumina, titanium carbide, and silicon carbide form their respective crystal grains. In the sintered body, carbon is a free component chemically combined to none of alumina, titanium carbide, and silicon carbide and mainly exists in crystal grain boundaries of alumina, titanium carbide, and silicon carbide.

The second magnetic head slider material differs from the first magnetic head slider material in that the sintered body further contains silicon carbide. The average crystal grain size of titanium carbide crystal grains in the sintered body is required to be greater than the average crystal grain size of alumina crystal grains in the second magnetic head slider material as well. This enables the magnetic head slider material to have a sufficient strength and raise the grinding speed sufficiently.

When a thin-film magnetic head operates, a write current and a read current flow in writing and reading processes, respectively, thereby heating the thin-film part of the thin-film magnetic head. In the writing process, the heat generated by the write current expands the thin-film part, whereby the medium-opposing surface of the thin-film part becomes convex. Such a deformation may reduce the clearance from the medium too much, thereby generating crashes. The heat generated by the read current may also affect the life of head functions. However, since the second magnetic head slider material further contains silicon carbide and thus can have a high thermal conductivity, it can reduce the influence of heat at the time of energization mentioned above when employed in a magnetic head slider, thereby rendering a high reliability.

The total content of titanium carbide and silicon carbide in the second magnetic head slider material is preferably 20 to 150 parts by weight when the weight of alumina is 100 parts by weight. Such a range makes it easier to yield a magnetic head substrate having a sufficient strength. When the titanium carbide concentration is less than 20 parts by weight, the rigidity tends to decrease, thereby lowering the strength. When the titanium carbide concentration exceeds 150 parts by weight, on the other hand, the sinterability tends to decrease, thereby lowering the strength.

When the alumina content in the second magnetic head slider material is 100 parts by weight, the silicon carbide content in the second magnetic head slider material is preferably 10 to 90 parts by weight, more preferably 25 to 45 parts by weight. When the silicon carbide content is less than 10 parts by weight, the thermal conductivity of the material is harder to attain sufficiently, whereby the heat dissipation of the magnetic head slider tends to become insufficient. When the silicon carbide content exceeds 90 parts by weight, on the other hand, the coefficient of thermal expansion tends to decrease. When the difference in coefficient of thermal expansion from the thin-film part is remarkable, differences in level are likely to occur between the substrate and the alumina base film at the time of using a magnetic head.

The titanium carbide content in the second magnetic head slider material is preferably at least 35 parts by weight when the weight of alumina is 100 parts by weight. This lowers the electric resistance of the material, whereby an antistatic effect is more likely to be obtained.

When the weight of alumina is 100 parts by weight, the carbon content in the second magnetic head slider material is preferably 0.2 to 9 parts by weight, more preferably 0.3 to 6 parts by weight, further preferably 0.5 to 3 parts by weight.

The carbon concentration exceeding 9 parts by weight is unfavorable, since the strength of the material tends to become too weak. When the carbon content is lower than 0.2 part by weight, on the other hand, the grinding speed is harder to become sufficiently high.

Preferably, the first and second magnetic head slider materials further contain titania. A preferred concentration of titania is 0.5 to 10 parts by weight when the weight of alumina is 100 parts by weight. When the magnetic head slider materials contain titania, their sinterability becomes higher, whereby a higher strength is easier to attain.

The magnetic head slider materials in accordance with this embodiment may further contain other components to such an extent that their characteristics are not affected thereby.

Method of Manufacturing Magnetic Head Slider Material

A method of manufacturing a magnetic head slider material in accordance with the present invention will now be explained. To begin with, a method of manufacturing the first magnetic head slider material will be explained as a first method of manufacturing a magnetic head slider material.

First, aluminum powder, titanium carbide powder, carbon powder, and titania powder as an additive if necessary are prepared.

Here, from the viewpoint of making the grain size of alumina crystal grains in the sintered body smaller, the average particle size of alumina powder is preferably 0.1 to 0.6 μm, more preferably 0.2 to 0.4 μm.

The average particle size of titanium carbide powder is preferably 0.1 to 1 μm, more preferably 0.2 to 0.6 μm. The titanium carbide powder may contain carbon.

The average particle size of alumina powder in the material is preferably ½ to ⅕.₅ of the average particle size of titanium carbide powder.

The average particle size of carbon powder is preferably 20 to 100 nm. Powders made of carbon such as carbon black and ethylene black, for example, can be used as carbon powder.

The average particle size of titania powder is preferably 0.1 to 3 μm, more preferably 0.5 to 1 μm.

These powders are mixed in an organic solvent such as ethanol, IPA, or 95% denatured ethanol, for example, so as to yield a mixed powder. If water is used as a solvent, titanium carbide will chemically react with the solvent, thereby oxidizing titanium carbide powder. Therefore, water cannot be used as the solvent here.

The alumina powder, titanium carbide powder, carbon powder, and titania powder in the mixed powder are compounded such that weights of titanium carbide, carbon, and titania satisfy their respective preferred conditions mentioned above when the total weight of alumina is 100 parts by weight.

Preferably, the powders are mixed in a ball mill or attritor. It will be preferred if the mixing of powders is performed for about 10 to 100 hours. As a mixing medium in the ball mill or attritor, alumina balls having a diameter of about 1 to 20 mm, for example, are preferably used.

Subsequently, the mixed powder is granulated by spraying. Here, it will be sufficient if the mixed powder is spray-dried in a hot wind of an inert gas such as nitrogen or argon substantially free of oxygen at a temperature of about 60 to 200° C. This forms a granule of the mixed powder having the composition mentioned above. Here, the particle size of the granule is preferably about 50 to 200 μm, for example.

Then, the above-mentioned organic solvent is added as necessary, so as to adjust the liquid content of the granule, such that about 0.1 to 10 wt % of the organic solvent is contained in the granule. Examples of the organic solvent used for adjusting the liquid content include organic solvents such as. ethanol, IPA, and 95% denatured ethanol. The organic solvent used when mixing the powders is usually employed. If water is used as a solvent, titanium carbide will chemically react with the solvent, thereby oxidizing titanium carbide powder. Therefore, water cannot be used as the solvent here, either.

Next, a predetermined mold is filled with the granule, and primary molding is carried out by cold pressing, so as to yield a molded body. Here, it will be sufficient if a mold made of a metal or carbon having an inner diameter of 150 nm for forming a disk is filled with the granule, for example, and cold pressing is effected at a pressure of about 5 to 15 MPa (about 50 to 150 kgf/cm$^2$), for example.

Subsequently, thus obtained molded body is hot-pressed, so as to yield a sintered body.

Here, an example of hot-pressing condition is such that the sintering temperature is 1,200 to 1,700° C., pressure is 10 to 50 MPa (about 100 to 500 kgf/cm$^2$), and the atmosphere is a nonoxidizing atmosphere such as vacuum, nitrogen, or argon. The nonoxidizing atmosphere is used in order to restrain titanium carbide from oxidizing. For molding the mixed powder, it will be preferred if a mold made of carbon is used. The sintering time of the molded body is preferably about 1 to 3 hours.

In this embodiment, the sintering temperature is preferably 1,600 to 1,700° C. Sintering at such a temperature can yield a sintered body having a high density.

Preferably, in this embodiment, the average particle size of alumina contained in the molded body is 0.6 μm or less, whereas the average particle size of titanium carbide contained in the molded body is 1 μm or less. In the process of heating up to the sintering temperature, the temperature rise rate is preferably at least 5° C./min when temperature rises from 500° C. to the sintering temperature.

After the sintering ends, the sintered body is left to cool in the furnace, whereby the magnetic head slider material is completed. Here, the form of the magnetic head slider material is not restricted in particular, whereas its examples include a disk-shaped substrate having a diameter of 6 inches and a thickness of 2.5 mm and rectangular substrates.

A second method of manufacturing such a magnetic head slider material will now be explained.

Though the above-mentioned first manufacturing method uses carbon powder, the second manufacturing method uses an organic matter instead. Specifically, alumina powder, titanium carbide powder, and the organic matter are initially mixed, so as to yield a mixture. Here, the organic matter is not restricted in particular, whereas its examples include polyvinyl alcohol, acrylic resin, and butyral resin. Additives such as titania powder may also be added to the mixture as necessary.

Subsequently, this mixture is heat-treated in a nonoxidizing atmosphere such as vacuum or nitrogen, so as to carbonize the organic matter in the mixture. Here, the carbonizing condition can arbitrarily be set as appropriate depending on the species of the organic matter and the like. For example, heat treatment for about 5 hours at 600° C. in a vacuum drying furnace or the like can yield a mixed powder containing alumina, titanium carbide, carbon, and titania and the like if necessary.

Thereafter, it will be sufficient if this mixed powder is molded and sintered as in the first manufacturing method.

Manufacturing with an organic matter as such can uniformly disperse carbon, thereby shortening the time required for dispersing carbon.

Though the molding is preferably performed after carbonizing the organic matter as mentioned above in order to yield a dense magnetic head slider, the organic matter may be carbonized after the molding.

Specifically, after yielding a mixture containing alumina powder, titanium carbide powder, the organic matter, and the like, this mixture is molded as in the first manufacturing method before being carbonized. Then, the molded body of the mixture containing the organic matter is heat-treated as mentioned above, so as to carbonize the organic matter, whereby the molded body containing alumina, titanium carbide, carbon, and the like can be obtained.

It will be sufficient in the second manufacturing method if respective concentrations of powders at the time of mixing alumina powder, titanium carbide powder, organic matter, and titania powder and the like added as necessary are set beforehand such that alumina, titanium carbide, carbon, and titania in the mixed powder or molded body after carbonizing the mixture attain their concentrations defined in the first manufacturing method. This yields a molded body having a composition similar to that in the first manufacturing method.

As a third method of manufacturing a magnetic head slider material, a method of manufacturing the second magnetic head slider material will now be explained.

First, alumina powder, titanium carbide powder, silicon carbide powder, carbon powder, and titania powder as an additive if necessary are prepared.

The materials other than silicon carbide powder are the same as those in the above-mentioned method of manufacturing the first magnetic head slider material.

The average particle size of silicon carbide powder is preferably 0.03 to 1 μm, more preferably 0.05 to 0.5 μm. The silicon carbide powder may contain carbon.

These powders are mixed in an organic solvent such as ethanol, IPA, or 95% denatured ethanol, for example, so as to yield a mixed powder. If water is used as a solvent, titanium carbide will chemically react with the solvent, thereby oxidizing titanium carbide powder. Therefore, water cannot be used as the solvent here.

The alumina powder, titanium carbide powder, silicon carbide powder, carbon powder, and titania powder in the mixed powder are compounded such that weights of titanium carbide, silicon carbide, carbon, and titania satisfy their respective preferred conditions mentioned above when the total weight of alumina is 100 parts by weight.

Subsequent steps are performed as in the method of manufacturing the first magnetic head slider material, whereby a magnetic head slider material is completed. As with the above-mentioned second manufacturing method, the third manufacturing method can use an organic matter in place of carbon powder.

Magnetic Head Slider

A magnetic head slider using this magnetic head slider material will now be explained with reference to FIG. 1.

The magnetic head slider 11 in accordance with an embodiment of the present invention includes a thin-film magnetic head 10, and is mounted to a hard disk drive (not depicted) equipped with a hard disk. This hard disk drive is configured such that the thin-film magnetic head 10 records/reads magnetic information onto/from a recording surface of the hard disk rotated at a high speed.

The magnetic head slider 11 in accordance with this embodiment has a substantially rectangular. parallelepiped form. In FIG. 1, the surface of the magnetic head slider 11 on the front side is a recording-medium-opposing surface disposed so as to oppose the recording surface of the hard disk, and is referred to as an air bearing surface (ABS) S. The air bearing surface is formed with a groove 11a extending in a direction orthogonal to the track width.

When the hard disk rotates, an airflow accompanying the rotation levitates the magnetic head slider 11, whereby the air bearing surface S moves away from the recording surface of the hard disk. The air bearing surface S may be coated with DLC (Diamond Like Carbon) and the like.

The magnetic head slider 11 comprises a substrate 13 made of the above-mentioned magnetic head slider material and a laminate 14, formed on the substrate 13, including the thin-film magnetic head 10. More specifically, in this embodiment, the substrate 13 has a rectangular parallelepiped form, whereas the laminate 14 is formed on a side face of the substrate 13.

The upper face 14a of the laminate 14 forms an end face of the magnetic head slider 11, whereas recording pads 18a, 18b and reproducing pads 19a, 19b connected to the thin-film magnetic head 10 are attached to the upper face 14a of the laminate 14. The thin-film magnetic head 10 is provided within the laminate 14 while partly exposing itself out of the air bearing surface S. In FIG. 1, the thin-film magnetic head 10 buried within the laminate 14 is illustrated by solid lines for easier recognition.

Such a magnetic head slider 11 is mounted to a gimbal 12, and is connected to an unshown suspension arm, so as to construct a head gimbal assembly.

Figure 1:
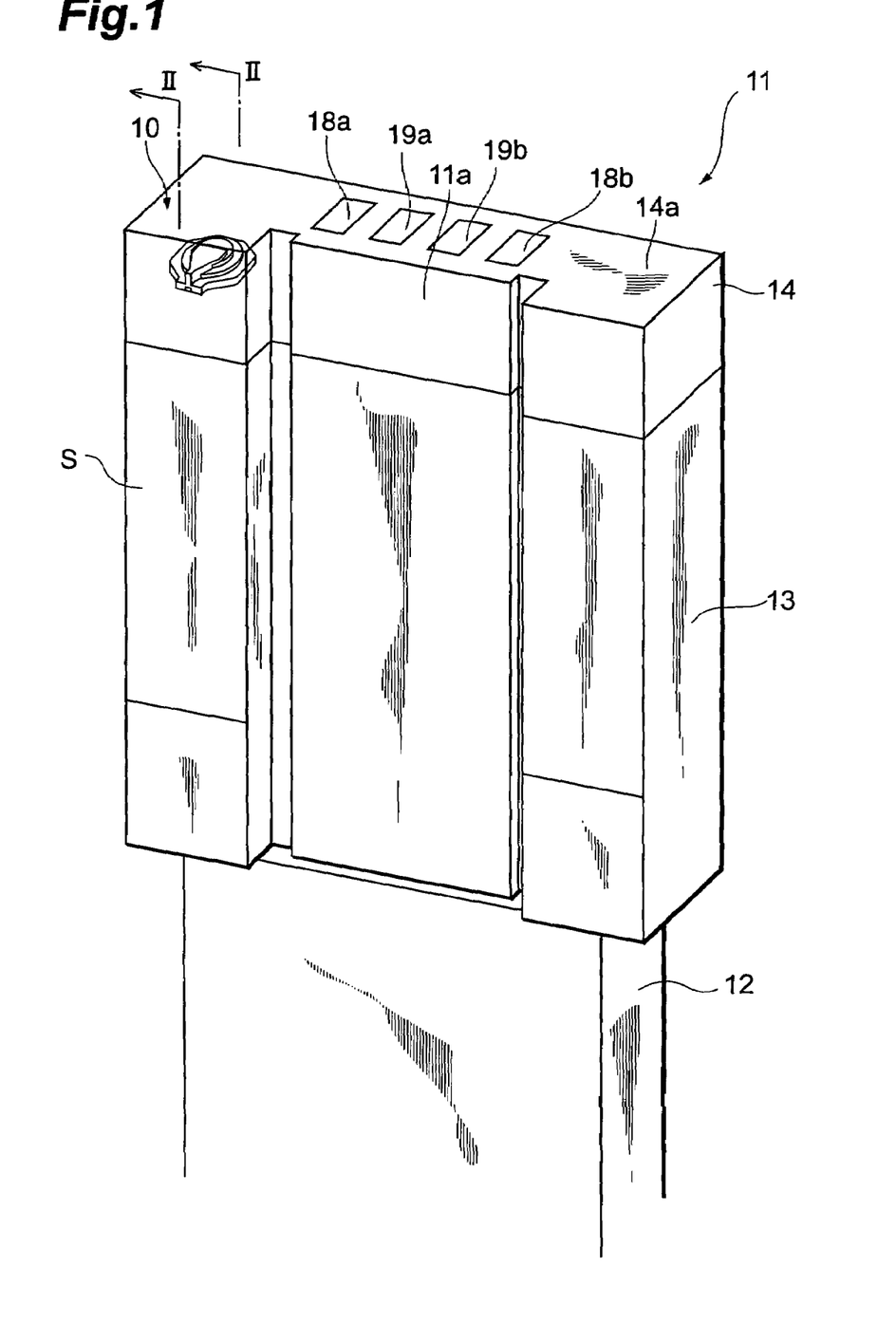
FIG. 1 is a perspective view of the magnetic head slider in accordance with an embodiment of the present invention.
Figure 2:
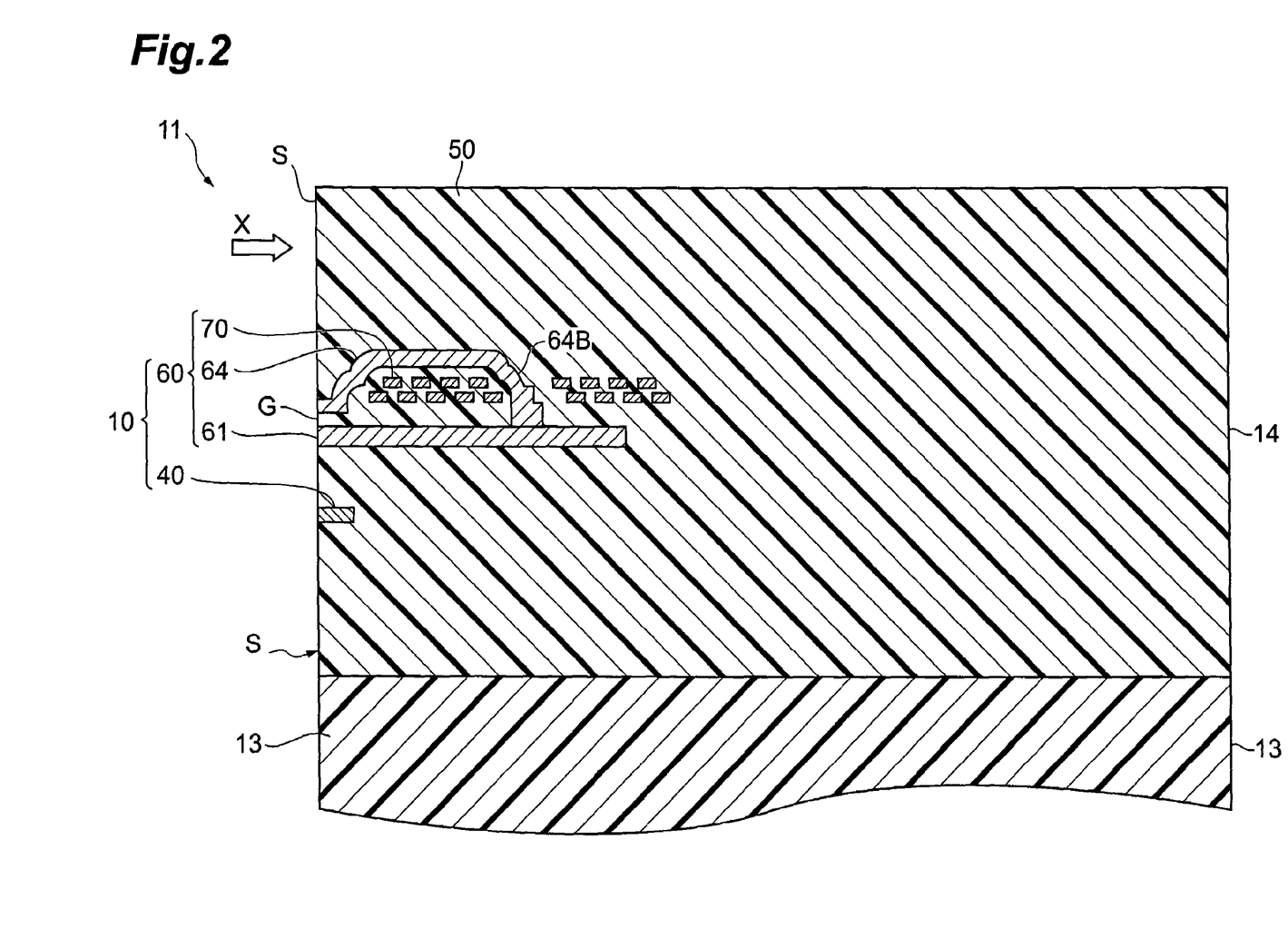
FIG. 2 is a view of the magnetic head slider taken along the line II-II of FIG. 1.

FIG. 2 is a schematic sectional view of the magnetic head slider 11 taken along a direction perpendicular to both the air bearing surface and track width (i.e., a schematic sectional view taken along the line II-II of FIG. 1). As mentioned above, the magnetic head slider 11 comprises the substantially rectangular sheet-like substrate 13 and the laminate 14 stacked on a side face of the substrate 13. The laminate 14 comprises the thin-film magnetic head 10 and a coating layer 50 surrounding the thin-film magnetic head 10.

The thin-film magnetic head 10 comprises, successively from the side closer to the substrate 13, a GMR (Giant MagnetoResistive) device 40 acting as a reading device for reading magnetic information from the hard disk and an inductive electromagnetic transducer 60 acting as a writing device for writing magnetic information onto the hard disk, and forms a so-called combination thin-film magnetic head.

The electromagnetic transducer 60, which employs a so-called in-plane recording scheme, comprises a lower magnetic pole 61 and an upper magnetic pole 64 in succession from the substrate 13 side, and further comprises a thin-film coil 70.

The end parts of the lower magnetic pole 61 and upper magnetic pole 64 on the air bearing surface S side are exposed at the air bearing surface S, whereas the respective exposed parts of the lower magnetic pole 61 and upper magnetic pole 64 are separated from each other by a predetermined distance, so as to form a recording gap G therebetween. On the other hand, the end part 64B of the upper magnetic pole 64 remote from the air bearing surface S is bent toward the lower magnetic pole 61 and is magnetically connected to the end part of the lower magnetic pole 61 remote from the air bearing surface S. As a consequence, the upper magnetic pole 64 and lower magnetic pole 61 form a magnetic circuit incorporating the gap G therewithin.

The thin-film coil 70 is disposed so as to surround the end part 64B of the upper magnetic pole 64, and generates a magnetic field in the recording gap G by electromagnetic inductance, thereby recording magnetic information onto the recording surface of the hard disk.

The GMR device 40 has an unshown multilayer structure and is exposed at the air bearing surface S, so as to detect changes in the magnetic field from the hard disk by utilizing a magnetoresistive effect, thereby reading the magnetic information.

The insulative coating layer 50 separates the GMR device 40 from the electromagnetic transducer 60, and the upper magnetic pole 64 from the lower magnetic pole 61. The thin-film magnetic head 10 itself is also covered with the coating layer 50 except for the air bearing surface S. The coating layer 50 is mainly formed by an insulating material such as alumina. Specifically, an alumina layer formed by sputtering or the like is usually used. Such an alumina layer typically has an amorphous structure.

The thin-film magnetic head 10 may also be of perpendicular recording type instead of in-plane recording type. An AMR (Anisotropic MagnetoResistive) device using an anisotropic magnetoresistive effect, a TMR (Tunneling MagnetoResistive) device using a magnetoresistive effect occurring in a tunnel junction, or the like may also be utilized in place of the GMR device 40.

The coating layer 50 may further include therewithin a magnetic layer or the like which magnetically insulates the GMR device 40 from the electromagnetic transducer 60.

A method of manufacturing the foregoing magnetic head slider 11 will now be explained.

Figure 3:
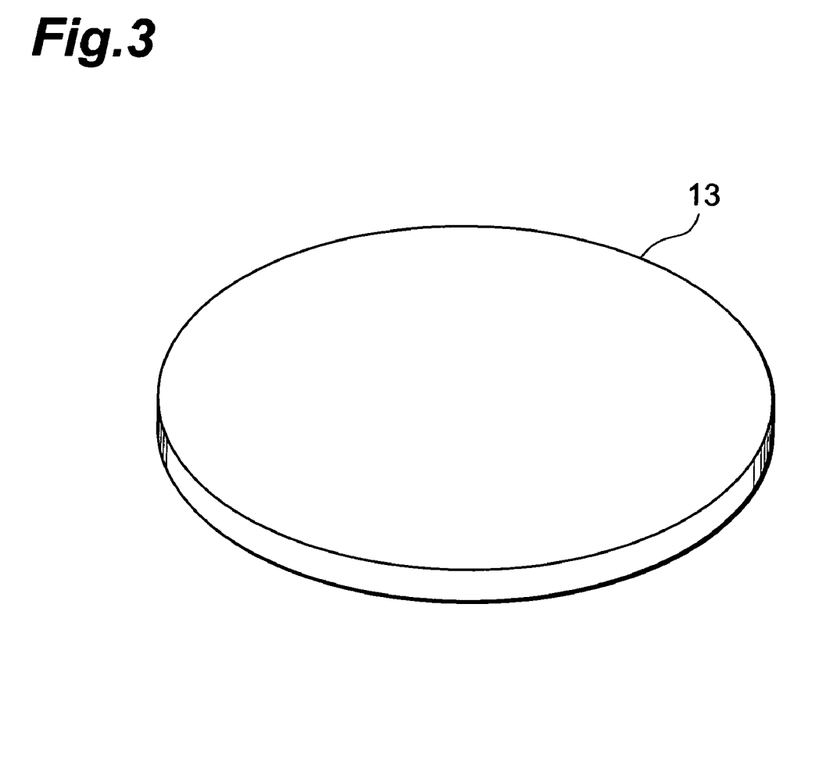
FIG. 3 is a perspective view for explaining the method of manufacturing a magnetic head slider in accordance with an embodiment of the present invention.
Figure 4:
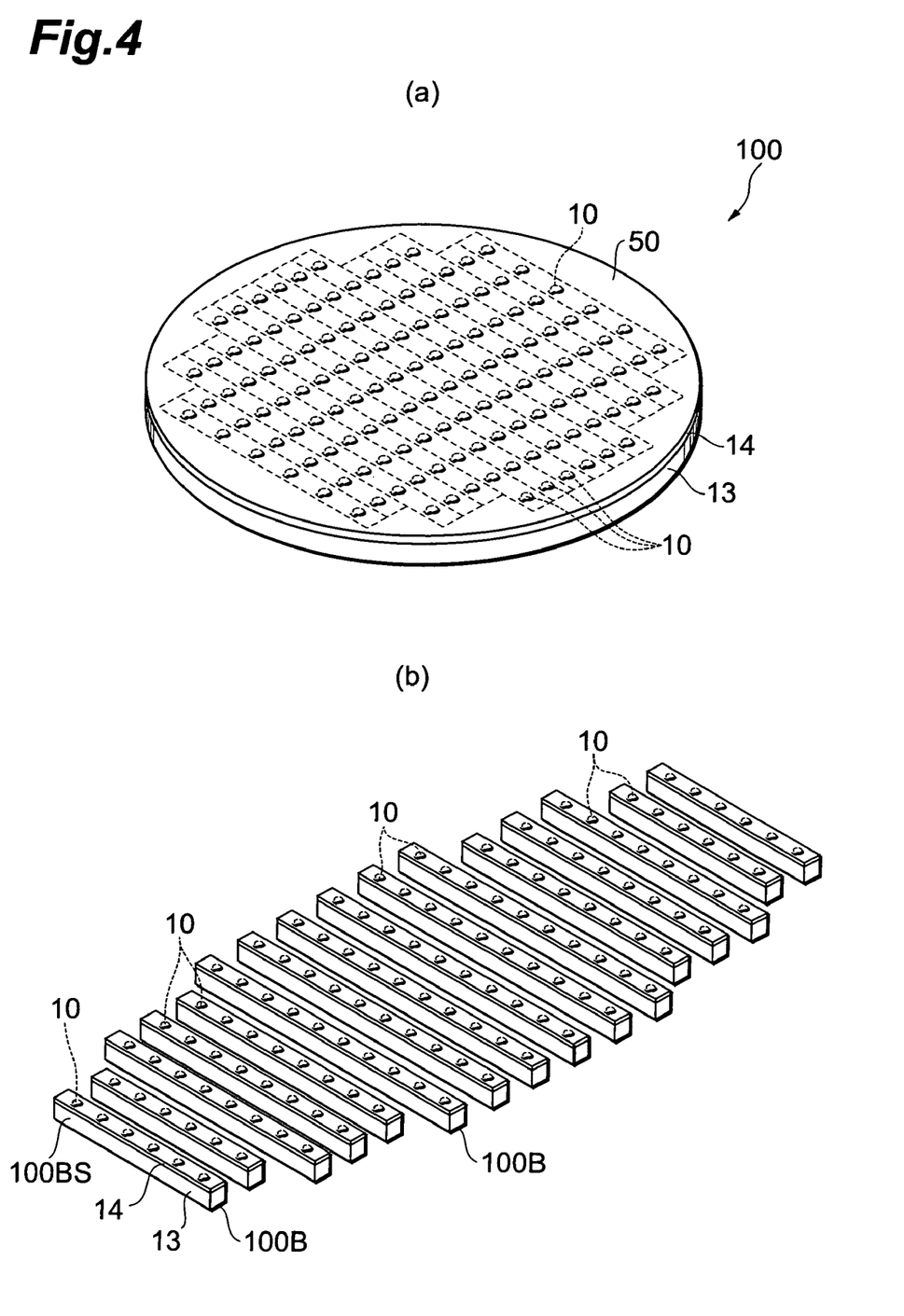
FIG. 4 shows perspective views of (a) and (b), subsequent to FIG. 3, for explaining the method of manufacturing a magnetic head slider in accordance with the embodiment of the present invention.

First, as mentioned above, a substrate 13 in which the above-mentioned magnetic head slider material is formed into a disk-shaped wafer is prepared as shown in FIG. 3. Next, as shown in (a) of FIG. 4, a laminate 14 including thin-film magnetic heads 10 and a coating layer 50 is laminated on the substrate 13 by a known technique. Here, the laminate 14 is formed such that a number of thin-film magnetic heads 10 are arranged in a matrix in the laminate 14.

Subsequently, the substrate 13 having the laminate 14 stacked thereon is cut into predetermined forms/sizes. Here, cutting as indicated by broken lines in (a) of FIG. 4, for example, forms a bar 100B in which a plurality of thin-film magnetic heads 10 are arranged in a row while being exposed at side faces 100BS, as shown in (b) of FIG. 4.

Then, a so-called lapping step, which forms the air bearing surface S by grinding the side face 100BS of each bar 100B, is performed. The lapping step grinds the substrate 13 and the laminate 14 stacked thereon simultaneously in a direction (direction of arrow X in FIG. 2) intersecting the laminating direction.

In this embodiment, the substrate 13 is made of a sintered body containing the above-mentioned magnetic head slider material, i.e., at least alumina, titanium carbide, and carbon, while the average crystal grain size of titanium carbide crystal grains is greater than the average crystal grain size of alumina crystal grains. Therefore, the grinding speed of the substrate 13 is much higher than that of the conventional substrate made of an AlTiC sintered body, and is on a par with the laminate 14 including the thin-film magnetic heads 10.

Figure 5:
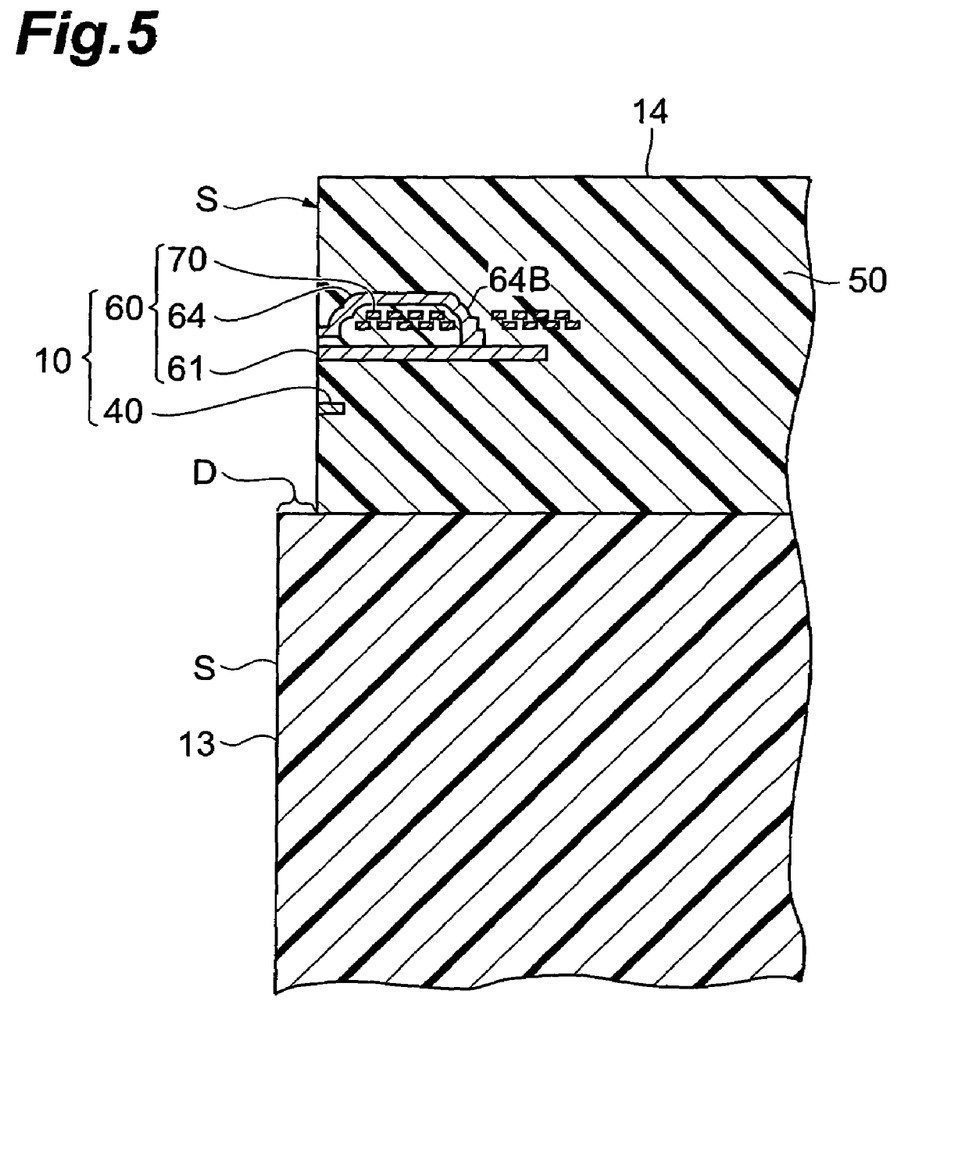
FIG. 5 is a schematic sectional view showing a state where a bar of (b) of FIG. 4 is ground.

Therefore, at the time of lapping, the difference in amount of grinding between the laminate 14 and the substrate 13 becomes very small, so that the difference in level D (see FIG. 5) between the laminate 14 and the substrate 13 becomes much smaller than the conventional one. This allows the air bearing surface S to attain a substantially flat state, for example. Specifically, the difference in level D can be reduced to 1.2 nm or less, for example.

Therefore, femto or smaller sliders can be made favorably, which makes it easier to achieve recording at a higher density. The substrate 13 in this embodiment has a sufficient strength and thus is fully reliable. When made of the above-mentioned magnetic head slider material further containing silicon carbide, the substrate 13 also exhibits an excellent heat dissipation.

EXAMPLES

The present invention will now be explained in detail with reference to examples and comparative examples, though the present invention is not restricted to these examples at all.

In the examples, a plurality of substrates of magnetic head slider materials whose constituent materials differed from each other were made, and the transverse strength, grinding speed, and electric resistance were measured for each of them.

Example 1

First, predetermined amounts of alumina powder (having an average particle size of 0.3 μm), titanium carbide powder (having an average particle size of 1.0 μm and containing 0.1 wt % of carbon), silicon carbide powder (having an average particle size of 0.4 μm and containing 0.1 wt % of carbon), titania powder (having an average particle size of 0.1 μm), and carbon powder (carbon black having an average particle size of 35 nm) were weighed so as to yield compounding ratios shown in Table 1, and were pulverized for 30 minutes together with IPA (isopropyl alcohol having a boiling point of 82.4° C.) in a ball mill, so as to be mixed. Thereafter, thus obtained mixture was granulated by spraying in nitrogen at 150° C. Each of the amounts of free carbon shown in Table 1 is the sum of amounts derived from carbon powder, titanium carbide powder, and silicon carbide powder.

Subsequently, thus obtained granule was primarily molded at about 0.5 MPa (50 kgf/cm$^2$). The resulting molded body was fired by hot pressing in a vacuum for 2 hours at a sintering temperature of 1,600° C. and a pressing pressure of about 30 MPa (about 300 kgf/cm$^2$), whereby the magnetic head slider material of Example 1 was obtained. The temperature raising condition up to the sintering temperature was such that the temperature rise time was 5.6° C./min from normal temperature to 500° C., and 20° C./min from 500° C. to the sintering temperature (1,600° C.).

Measurement of Average Crystal Grain Sizes of Alumina Crystal Grains and Titanium Carbide Crystal Grains Each of thus obtained magnetic head slider materials was cut into a piece of about 20×1.8×2 mm. The cut section was processed into a mirror surface and was thermally etched at (the sintering temperature—100)° C. This surface was photographed under a magnification of 30,000× with a scanning electron microscope, and straight lines were radially drawn on this photograph. Specifically, a vertical line, a horizontal line, and two diagonal lines (having a total length of 30 mm) were drawn so as to pass the center of the rectangular photograph of 9 mm (L)×12 mm (W). Then, the number of intersections at which the lines cross crystal grain boundaries was counted, and the average crystal grain sizes of crystal grains of titanium carbide and alumina were determined by the calculation of (the total length of lines (mm))/(the total number of intersections×the photographic magnification). Table 1 shows thus obtained average crystal grain sizes (μm) of crystal grains of alumina and titanium carbide.

Measurement of Grinding Speed

Each of thus obtained magnetic head slider materials was cut into a piece of about 20×20×1.8 mm, so as to make a test piece. Using a slurry containing diamond particles having a diameter of 0.1 μm, the test piece was ground with a single-side grinder. The grinding condition was such that the tin plate rotating speed was 37.5 rpm, the load was 2,550 g, the Oscar motor rotating speed was 55 rpm, and the grinding time was 10 minutes. The thickness of each test piece was measured before and after grinding, and the change in thickness was divided by the grinding time, whereby the grinding speed was acquired in each test piece. Thus obtained grinding speeds were standardized while taking the value of the following Example 14 as 100, and are indicated in Table 1 by symbols according to the following criteria:

O : 120% or more of the value of Example 14
Δ: at least 100% but less than 120%
X: less than 100%

Measurement of Transverse Strength

Using a tester manufactured by Shimadzu Corporation, the transverse strength of each substrate was measured under the condition of JIS R1601 (1995). In Table 1, the case with a transverse strength of 400 MPa or greater was indicated by symbol "O" as being sufficient in strength, whereas the case with a transverse strength of less than 400 MPa was indicated by symbol "X" as being insufficient in strength.

Measurement of Electric Resistance

The electric resistance of each of the test pieces was measured according to JIS R1637 (1998). In Table 1, the case with an electric resistance of $10^6$ Ω·cm or less is indicated by symbol "O" as one having a sufficiently low electric resistance, whereas the case with an electric resistance exceeding $10^6$ Ω·cm is indicated by symbol "X" as one whose electric resistance is too high.

TABLE 1

| | ALUMINA (PARTS BY WEIGHT) | TITANIUM CARBIDE (PARTS BY WEIGHT) | SILICON CARBIDE (PARTS BY WEIGHT) | FREE CARBON (PARTS BY WEIGHT) | TITANIA (PARTS BY WEIGHT) | TEMPERATURE RISE RATE (° C./MIN) |
|---|---|---|---|---|---|---|
| EXAMPLE1 | 100 | 60 | 40 | 3.3 | 6.7 | 20 |
| EXAMPLE2 | 100 | 60 | 40 | 3.3 | 6.7 | 20 |
| EXAMPLE3 | 100 | 60 | 40 | 3.3 | 6.7 | 20 |
| EXAMPLE4 | 100 | 60 | 0 | 0.9 | 6.7 | 20 |
| EXAMPLE5 | 100 | 60 | 40 | 3.3 | 6.7 | 10 |
| EXAMPLE6 | 100 | 60 | 40 | 3.3 | 6.7 | 10 |
| EXAMPLE7 | 100 | 60 | 40 | 3.3 | 6.7 | 10 |
| EXAMPLE8 | 100 | 60 | 0 | 0.9 | 6.7 | 10 |
| EXAMPLE9 | 100 | 60 | 40 | 3.3 | 6.7 | 5 |
| EXAMPLE10 | 100 | 60 | 40 | 3.3 | 6.7 | 5 |
| EXAMPLE11 | 100 | 60 | 40 | 3.3 | 6.7 | 5 |
| EXAMPLE12 | 100 | 60 | 0 | 0.9 | 6.7 | 5 |
| EXAMPLE13 | 100 | 60 | 40 | 3.3 | 6.7 | 2 |
| EXAMPLE14 | 100 | 60 | 40 | 3.3 | 6.7 | 1 |
| COMPARATIVE EXAMPLE1 | 100 | 60 | 40 | 3.3 | 6.7 | 2 |
| COMPARATIVE EXAMPLE2 | 100 | 60 | 40 | 3.3 | 6.7 | 2 |
| COMPARATIVE EXAMPLE3 | 100 | 60 | 0 | 0.9 | 6.7 | 2 |
| COMPARATIVE EXAMPLE4 | 100 | 60 | 40 | 3.3 | 6.7 | 1 |
| COMPARATIVE EXAMPLE5 | 100 | 60 | 40 | 3.3 | 6.7 | 1 |
| COMPARATIVE EXAMPLE6 | 100 | 60 | 0 | 0.9 | 6.7 | 1 |

| | CRYSTAL GRAIN SIZE (MM) | | TRANSVERSE STRENGTH | GRINDING SPEED | ELECTRIC RESISTANCE |
|---|---|---|---|---|---|
| | $Al_2O_3$ | TiC | | | |
| EXAMPLE1 | 0.30 | 1.00 | ○ | ○ | ○ |
| EXAMPLE2 | 0.30 | 0.60 | ○ | ○ | ○ |
| EXAMPLE3 | 0.30 | 0.40 | ○ | ○ | ○ |
| EXAMPLE4 | 0.35 | 0.60 | ○ | ○ | ○ |
| EXAMPLE5 | 0.30 | 1.00 | ○ | ○ | ○ |
| EXAMPLE6 | 0.30 | 0.60 | ○ | ○ | ○ |
| EXAMPLE7 | 0.30 | 0.40 | ○ | ○ | ○ |
| EXAMPLE8 | 0.40 | 0.60 | ○ | ○ | ○ |
| EXAMPLE9 | 0.35 | 1.00 | ○ | ○ | ○ |
| EXAMPLE10 | 0.35 | 0.60 | ○ | ○ | ○ |
| EXAMPLE11 | 0.35 | 0.40 | ○ | ○ | ○ |

TABLE 1-continued

| | | | | | |
|---|---|---|---|---|---|
| EXAMPLE12 | 0.50 | 0.60 | ○ | ○ | ○ |
| EXAMPLE13 | 0.60 | 1.00 | ○ | ○ | ○ |
| EXAMPLE14 | 0.80 | 1.00 | ○ | Δ | ○ |
| COMPARATIVE EXAMPLE1 | 0.60 | 0.60 | ○ | x | ○ |
| COMPARATIVE EXAMPLE2 | 0.60 | 0.40 | ○ | x | ○ |
| COMPARATIVE EXAMPLE3 | 0.70 | 0.60 | ○ | x | ○ |
| COMPARATIVE EXAMPLE4 | 0.80 | 0.60 | ○ | x | ○ |
| COMPARATIVE EXAMPLE5 | 0.80 | 0.40 | ○ | x | ○ |
| COMPARATIVE EXAMPLE6 | 0.90 | 0.60 | ○ | x | ○ |

Example 2

The magnetic head slider material of Example 2 was obtained as in Example 1 except that titanium carbon powder having an average particle size of 0.6 μm and containing 0.1 wt % of carbon was used instead of the one having an average particle size of 1.0 μm and containing 0.1 wt % of carbon. Thus obtained magnetic head slider material was evaluated as in Example 1. Table 1 shows the results. The grinding speed of the magnetic head slider material of Example 2 was 220% of the grinding speed in Example 14.

Example 3

The magnetic head slider material of Example 3 was obtained as in Example 1 except that titanium carbon powder having an particle size of 0.4 μm and containing 0.1 wt % of carbon was used instead of the one having an average particle size of 1.0 μm and containing 0.1 wt % of carbon. Thus obtained magnetic head slider material was evaluated as in Example 1. Table 1 shows the results.

Example 4

The magnetic head slider material of Example 4 was obtained as in Example 2 except that the compounding amount of free carbon was used as shown in Table 1 without using silicon carbide. Thus obtained magnetic head slider material was evaluated as in Example 1. Table 1 shows the results.

Example 5

The magnetic head slider material of Example 5 was obtained as in Example 1 except that the temperature rise rate from 500° C. to the sintering temperature (1,600° C.) was 10° C./min. Thus obtained magnetic head slider material was evaluated as in Example 1. Table 1 shows the results.

Example 6

The magnetic head slider material of Example 6 was obtained as in Example 2 except that the temperature rise rate from 500° C. to the sintering temperature (1,600° C.) was 10° C./min. Thus obtained magnetic head slider material was evaluated as in Example 1. Table 1 shows the results. The grinding speed of the magnetic head slider material of Example 6 was 200% of the grinding speed in Example 14.

Example 7

The magnetic head slider material of Example 7 was obtained as in Example 3 except that the temperature rise rate from 500° C. to the sintering temperature (1,600° C.) was 10° C./min. Thus obtained magnetic head slider material was evaluated as in Example 1. Table 1 shows the results.

Example 8

The magnetic head slider material of Example 8 was obtained as in Example 4 except that the temperature rise rate from 500° C. to the sintering temperature (1,600° C.) was 10° C./min. Thus obtained magnetic head slider material was evaluated as in Example 1. Table 1 shows the results.

Example 9

The magnetic head slider material of Example 9 was obtained as in Example 1 except that the temperature rise rate from 500° C. to the sintering temperature (1,600° C.) was 5° C./min. Thus obtained magnetic head slider material was evaluated as in Example 1. Table 1 shows the results.

Example 10

The magnetic head slider material of Example 10 was obtained as in Example 2 except that the temperature rise rate from 500° C. to the sintering temperature (1,600° C.) was 5° C./min. Thus obtained magnetic head slider material was evaluated as in Example 1. Table 1 shows the results. The grinding speed of the magnetic head slider material of Example 10 was 180% of the grinding speed in Example 14.

Example 11

The magnetic head slider material of Example 11 was obtained as in Example 3 except that the temperature rise rate from 500° C. to the sintering temperature (1,600° C.) was 5° C./min. Thus obtained magnetic head slider material was evaluated as in Example 1. Table 1 shows the results.

Example 12

The magnetic head slider material of Example 12 was obtained as in Example 4 except that the temperature rise rate from 500° C. to the sintering temperature (1,600° C.) was 5°

C./min. Thus obtained magnetic head slider material was evaluated as in Example 1. Table 1 shows the results.

Example 13

The magnetic head slider material of Example 13 was obtained as in Example 1 except that the temperature rise rate from 500° C. to the sintering temperature (1,600° C.) was 2° C./min. Thus obtained magnetic head slider material was evaluated as in Example 1. Table 1 shows the results.

Example 14

The magnetic head slider material of Example 14 was obtained as in Example 1 except that the temperature rise rate from 500° C. to the sintering temperature (1,600° C.) was 1° C./min. Thus obtained magnetic head slider material was evaluated as in Example 1. Table 1 shows the results.

Comparative Example 1

The magnetic head slider material of Comparative Example 1 was obtained as in Example 2 except that the temperature rise rate from 500° C. to the sintering temperature (1,600° C.) was 2° C./min. Thus obtained magnetic head slider material was evaluated as in Example 1. Table 1 shows the results. The grinding speed of the magnetic head slider material of Comparative Example 1 was 70% of the grinding speed in Example 14.

Comparative Example 2

The magnetic head slider material of Comparative Example 2 was obtained as in Example 3 except that the temperature rise rate from 500° C. to the sintering temperature (1,600° C.) was 2° C./min. Thus obtained magnetic head slider material was evaluated as in Example 1. Table 1 shows the results.

Comparative Example 3

The magnetic head slider material of Comparative Example 3 was obtained as in Example 4 except that the temperature rise rate from 500° C. to the sintering temperature (1,600° C.) was 2° C./min. Thus obtained magnetic head slider material was evaluated as in Example 1. Table 1 shows the results.

Comparative Example 4

The magnetic head slider material of Comparative Example 4 was obtained as in Example 2 except that the temperature rise rate from 500° C. to the sintering temperature (1,600° C.) was 1° C./min. Thus obtained magnetic head slider material was evaluated as in Example 1. Table 1 shows the results. The grinding speed of the magnetic head slider material of Comparative Example 4 was 50% of the grinding speed in Example 14.

Comparative Example 5

The magnetic head slider material of Comparative Example 5 was obtained as in Example 3 except that the temperature rise rate from 500° C. to the sintering temperature (1,600° C.) was 1° C./min. Thus obtained magnetic head slider material was evaluated as in Example 1. Table 1 shows the results.

Comparative Example 6

The magnetic head slider material of Comparative Example 6 was obtained as in Example 4 except that the temperature rise rate from 500° C. to the sintering temperature (1,600° C.) was 1° C./min. Thus obtained magnetic head slider material was evaluated as in Example 1. Table 1 shows the results.

As shown in Table 1, the magnetic head slider materials of Examples 1 to 14 were found to be able to yield a sufficiently high grinding speed while having a sufficiently high transverse strength. The substrates made of the magnetic head slider materials of Examples 1 to 14 were found to exhibit an electric resistance lower than $10^6$ $\Omega\cdot$cm ($10^9$ m$\Omega\cdot$cm). By contrast, the grinding speed was not sufficiently high in the magnetic head slider materials of Comparative Examples 1 to 6 in which the average crystal grain size of alumina crystal grains was not smaller than the average crystal grain size of titanium carbide crystal grains in the magnetic head slider materials.

What is claimed is:

1. A magnetic head slider material made of a sintered body containing alumina, titanium carbide, and carbon;
   wherein a titanium carbide crystal grain has an average crystal grain size greater than that of an alumina crystal grain in the sintered body so that a grinding speed of the sintered body is substantially similar to that of a laminate of the magnetic head slider and the sintered body has a sufficient transverse strength.

2. A magnetic head slider material according to claim 1, wherein the average crystal grain size of the alumina crystal grain is 0.75 μm or less.

3. A magnetic head slider material according to claim 1, wherein the average crystal grain size of the titanium carbide crystal grain is 1 μm or less.

4. A magnetic head slider material according to claim 1, wherein the sintered body further comprises silicon carbide.

5. A magnetic head slider comprising a substrate made of a sintered body and a laminate, formed on the sintered body, including a thin-film magnetic head;
   wherein the sintered body contains alumina, titanium carbide, and carbon, while a titanium carbide crystal grain has an average crystal grain size greater than that of an alumina crystal grain in the sintered body so that a grinding speed of the sintered body is substantially similar to that of the laminate and the sintered body has a sufficient transverse strength.

6. A magnetic head slider according to claim 5, wherein the average crystal grain size of the alumina crystal grain is 0.75 μm or less.

7. A magnetic head slider according to claim 5, wherein the average crystal grain size of the titanium carbide crystal grain is 1 μm or less.

8. A magnetic head slider according to claim 5, wherein the sintered body further comprises silicon carbide.

9. A method of manufacturing a magnetic head slider material, the method comprising:
   a step of preparing a molded body containing alumina, titanium carbide, and carbon; and
   a sintering step of manufacturing a sintered body by sintering the molded body at a predetermined sintering temperature in a nonoxidizing atmosphere so that an average crystal grain size of an alumina crystal grain becomes smaller than that of a titanium carbide crystal grain in the sintered body, wherein a grinding speed of the sintered body is substantially similar to that of a laminate of the magnetic head slider and the sintered body has a sufficient transverse strength.

10. A method of manufacturing a magnetic head slider material according to claim 9, wherein alumina contained in the molded body has an average particle size of 0.6 μm or less while titanium carbide contained in the molded body has an average particle size of 1 μm or less in the step of preparing the molded body.

11. A method of manufacturing a magnetic head slider material according to claim 9, wherein the temperature rise rate is at least 5° C./min when temperature rises from 500° C. to the sintering temperature in the sintering step.

12. A method of manufacturing a magnetic head slider material according to claim 9, wherein the molded body further comprises silicon carbide.

* * * * *